UNITED STATES PATENT OFFICE.

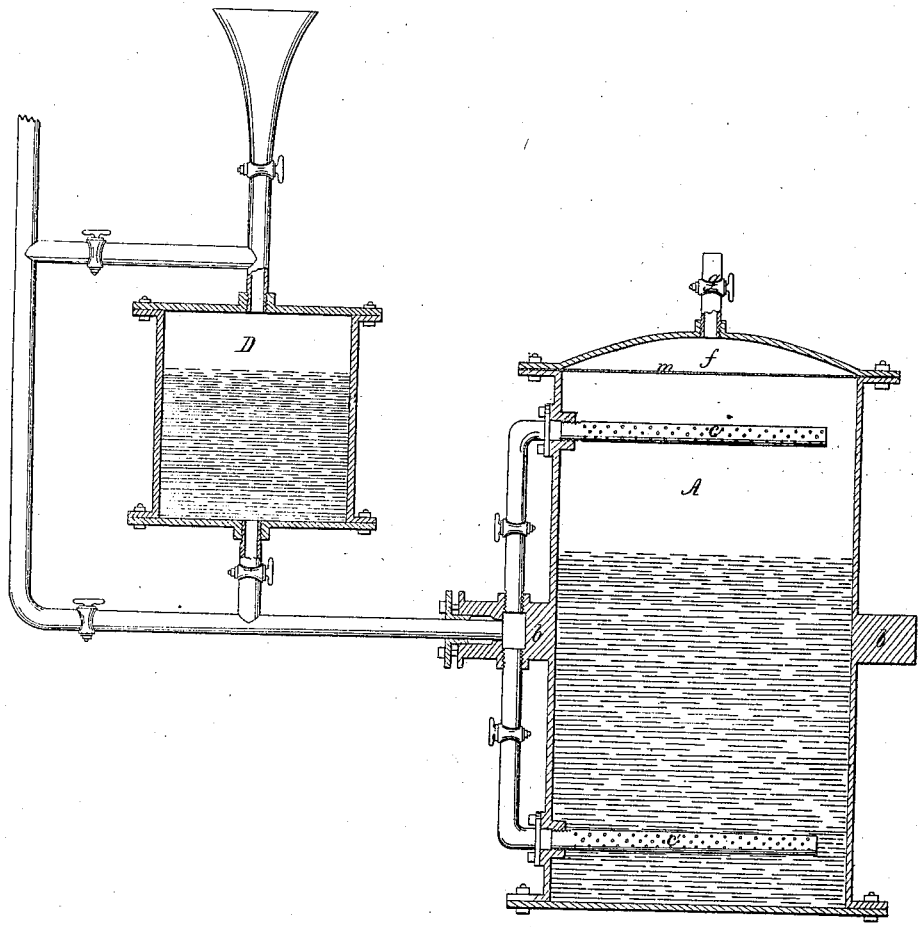

ALFRED PARAF, OF NEW YORK, N. Y., ASSIGNOR TO JULIUS GERSON, OF SAME PLACE.

IMPROVED PROCESS OF EXTRACTING THE COLORING-MATTER OF MADDER.

Specification forming part of Letters Patent No. 86,939, dated February 16, 1869.

*To all whom it may concern:*

Be it known that I, ALFRED PARAF, a resident of the city, county, and State of New York, have invented a new and useful Process of Extracting the Coloring-Matter of Madder-Root from the ligneous matter of the plant; and I do hereby declare that the following is a full, clear, and exact description of my said invention.

The coloring-matter of madder has hitherto been found to be practically insoluble in water. The invention which constitutes the subject-matter of this patent is based upon the discovery that when the madder-root is subjected to a temperature of about 305° of Fahrenheit's thermometer the coloring-matter becomes soluble in pure water, and can be removed from the woody fiber by successive washings with water of about that temperature, and that the coloring-matter carried off by the water may be precipitated in a flocculent state from the water, the precipitation being effected by cooling down the solution from the said temperature.

The invention consists, first, of the process of extracting the coloring-matter of the madder-root by treating it with water at a temperature of about 305°, and then precipitating the coloring-matter from the water while out of contact with the madder-root.

The invention consists, further, of the process of extracting the sugary and coloring matters from the madder-root, by dissolving the sugary matter in water at a moderate temperature, and extracting the coloring-matter by treatment with water at a high temperature, (say, about 305° of Fahrenheit,) and precipitating the coloring-matter from the resulting liquid out of contact with the ligneous matter of the root.

The invention consists, further, of the process of extracting the resinous and coloring matters from madder-root, by treating the material with acid to remove the resinous matters, then treating it with water at a high temperature, (say, 305° of Fahrenheit, or thereabout,) and precipitating the coloring-matter from the resulting liquid out of contact with the ligneous matter of the root.

The invention may be practiced in several ways. That which is deemed the best is effected by means of an apparatus such as is represented partly in section in the accompanying drawing; but the invention is not restricted to any peculiar form or construction of apparatus.

The said apparatus consists substantially of a strong vessel or digester, A, fitted with trunnions $b\ b$, on which it can be turned, and with perforated pipes $c\ c'$, by which steam can be injected into its interior; of a second vessel, D, by means of which hot water under pressure may be introduced into the first vessel, A, and of the steam-pipes and stop-cocks, by which high-pressure steam from a suitable high-pressure boiler may be supplied to the water-vessel D and to the digester A. The digesting-vessel A has a domed head, $f$, which is separated from the cylindrical portion of the vessel by a diaphragm of wire-cloth, $m$.

The said invention may be carried into effect as follows: The dry ground madder-root is prepared for the extraction of the coloring-matter by washing it with water to free it from the sugary matter contained in the root. To this end the root is steeped in about fifteen times its weight of lukewarm water for about half an hour. The water is then removed from the root by straining or otherwise, and the root is subjected to a second steeping, performed in the same manner as the first. The madder-root is freed from the second water by straining or otherwise.

The water employed in these operations holds a large quantity of sugary matter in solution, amounting generally to about forty per cent. of the weight of the dry madder-root, and the solution may be used for the manufacture of alcohol, or other purposes to which it is applicable.

The moist madder-root is further prepared for the extracting process by treating it with dilute sulphuric acid. For this purpose concentrated commercial sulphuric acid is diluted with sufficient water to reduce its specific gravity to 25° of Baumé. The quantity of concentrated acid of 66° Baumé required for the purpose is about one-quarter of the original weight of the dry madder-root. The moist madder-root is boiled in the dilute acid for two hours, after which the acid liquor is drained off, the madder-root is thoroughly washed to free it from the acid liquor, and the surplus water is removed by pressure or by the action of a centrifugal machine, so as to leave the material in a damp condition. The material in this condition is well prepared for the extracting process, and is substantially the same article as the garancine of commerce.

The extracting process is conducted, by preference, as follows: A quantity of the damp garancine is mixed with about four times its weight of distilled water, and the mixture is introduced into the digesting-vessel A, which should be filled to the extent of two-thirds or three-quarters its capacity. At the same time the water-vessel D is filled with distilled water, which is heated by letting into it the steam from the steam-boiler.

Steam from the steam-boiler, at a pressure of from fifty to sixty pounds per square inch above the atmospheric pressure, is let into the digester, through the lower perforated pipe, $c'$, and the stop-cock $g$ is left open until the air in the vessel is blown out. The stop-cock is then closed and the temperature permitted to rise to the temperature of the steam, say from 302° to 315° Fahrenheit.

As soon as this temperature is reached—which may be ascertained by means of a thermometer, the bulb of which is secured in the digester, or by means of a pressure-gage connected with the digester—the digester is reversed upon its trunnions so as to place the stop-cock $g$ at the lowest position, and this stop-cock is opened to permit the liquid to escape.

As the liquid escapes about an equal quantity of water, at the same temperature, is permitted to enter the digester from the hot-water vessel D, along with steam through the perforated pipe $c$, so that the material in the digester is uniformly, or thereabout, mixed with the liquid.

The first liquor which escapes from the digester is of a yellow color, and is charged with pectic acid. This liquor may be permitted to run to waste.

As the operation progresses the liquor escaping at the stop-cock becomes charged with the coloring-matter of the garancine, and must be saved in a suitable tank.

The supply of hot water, at the temperature of the steam, or thereabout, and the supply of steam to the digester are kept up, as the liquor is drawn off from the digester, until the garancine is exhausted of coloring-matter.

When this is effected the liquor running from the digester does not precipitate coloring-matter upon cooling, nor upon the addition of a weak acid. The supply of steam and water is then stopped, the digester is blown off, the spent material is removed, and the apparatus is recharged.

In practice, about two hours' time is required for an operation, and a quantity of water, equal to about five and a half times the original weight of the dry madder-root is required to remove the coloring-matter.

The temperature in the digester during the operation is maintained by keeping the steam at the requisite pressure in the steam-boiler, and the material is prevented from clogging upon the filtering-diaphragm by the constant agitation produced by the admission of steam through the perforated pipe $c$, which is immersed in the mixture in the digester.

The liquor charged with the coloring-matter is permitted to cool in a suitable vat, whereby the greater part of the coloring-matter is precipitated in a flocculent state. The liquor is subsequently filtered to separate all the coloring-matter.

The coloring-matter is thoroughly washed with water and drained, and is then in a suitable condition for printing fabrics.

The coloring-matter of madder obtained by this process is denominated "tinctorine."

In practice, it has been found expedient to make the digester of iron lined with sheet-lead, so that the coloring-matter may not be soiled by the action of acid upon iron.

In establishments where power can be furnished, it is expedient also to use a force-pump to supply water to the digester in place of the water-vessel.

Another mode in which the invention may be practiced is as follows—viz., to add to the distilled water a sufficient quantity of some soluble salt, which will raise the boiling-point to 302° Fahrenheit, or more, and to boil the garancine in the solution in an open vessel, the liquor being progressively drawn off through a strainer, and fresh quantities of the solution being introduced into the vessel until the coloring-matter is extracted. A salt which may be used for this purpose is the chloride of zinc. But this mode of practicing the invention is not deemed as advantageous as that first described, because it is difficult to free the precipitated tinctorine of the zinc or its salts.

The treatment of the madder-root by washing and by sulphuric acid is advantageous, as the effect is to remove the sugary, gummy, and resinous matters from the material before the coloring-matter is extracted; also, to partially char the cellular tissue of the plant, and thus facilitate the extraction of the coloring-matter; but the coloring-matter may be extracted directly from the ground madder-root without such preparation, by introducing it, mixed with water, into the digester, and treating it with water at a high temperature, and a substantial portion of the invention may thus be used without the residue.

What is claimed as the invention, to be secured by Letters Patent, is—

1. The process of extracting the coloring-matter of madder-root, by treating the material with water at a high temperature and then precipitating the coloring-matter from the liquid, substantially as before described.

2. Also, the compound process of separating the sugary and coloring matters from madder-root, by first washing it with water, to remove the sugary matter, then treating the washed madder-root with water at a high temperature, and precpitating the coloring-matter from the resulting liquid, substantially as before described.

3. Also, the compound process of separating the resinous and coloring matters from madder-root, by heating the madder-root in the acid liquor, to remove the resinous matter, then treating the material with water at a high temperature, and precipitating the coloring-matter from the resulting liquid, substantially as before set forth.

ALFRED PARAF.

Witnesses:
S. HAYMONY,
JULIUS GERSON.